United States Patent [19]

McKnight

[11] Patent Number: 4,580,347
[45] Date of Patent: Apr. 8, 1986

[54] LIGHTED AND MAGNETIZED TAPE MEASURE WITH COMBINATION MARKER AND CLOTHING-ATTACHMENT ARM MEMBER

[76] Inventor: Fred H. McKnight, 2085 Lincolnshire Dr., Marrero, La. 70072

[21] Appl. No.: 643,568

[22] Filed: Aug. 23, 1984

[51] Int. Cl.⁴ .................... G01B 3/10; A44B 21/00
[52] U.S. Cl. ................................ 33/138; 24/3 J; 242/84.8; 224/252
[58] Field of Search .......... 33/138, 137 R, 139, 33/140, DIG. 1; 242/84.8; 224/252, 269; 24/3 H, 3 J, 3 L, 509, 510

[56] References Cited

U.S. PATENT DOCUMENTS

| | | | |
|---|---|---|---|
| 862,139 | 8/1907 | Darrow | 33/138 |
| 1,356,018 | 10/1920 | Schmeing | 24/3 J |
| 1,876,744 | 9/1932 | Posgate | 33/138 X |
| 2,064,862 | 12/1936 | Szabo | 242/84.8 |
| 2,354,853 | 8/1944 | Dobbs | 33/138 X |
| 2,804,538 | 8/1957 | Leone | 33/138 X |
| 2,992,487 | 7/1961 | Miller | 33/138 |
| 3,036,791 | 5/1962 | Siggelkow | 33/138 X |
| 3,255,531 | 6/1966 | Anderson | 33/138 |
| 3,443,316 | 5/1969 | Edgell | 33/138 |
| 4,100,653 | 7/1978 | Sensabaugh | 224/252 X |
| 4,228,589 | 10/1980 | Chemay | 33/138 |
| 4,286,387 | 9/1981 | Di Diego | 33/138 |
| 4,462,160 | 7/1984 | Cohen et al. | 33/138 |

FOREIGN PATENT DOCUMENTS

| | | | |
|---|---|---|---|
| 837320 | 4/1952 | Fed. Rep. of Germany | 33/137 R |
| 1446379 | 6/1966 | France | 33/138 |
| 1473242 | 2/1967 | France | 33/138 |
| Ad.91404 | 4/1968 | France | 33/138 |
| Ad.91635 | 6/1968 | France | 33/138 |
| 266920 | 5/1950 | Switzerland | 33/138 |

*Primary Examiner*—Robert S. Ward
*Attorney, Agent, or Firm*—Pravel, Gambrell, Hewitt & Kimball

[57] ABSTRACT

A housing for a flexible recoilable measuring tape which includes a battery operated light for emitting light directly onto the tape; a pair of magnetic foot members attached to the base of the apparatus for adhering onto metal beams or the like; and a flexible holder wherein the belt or waistband is engaged between a flexible arm and the apparatus for placement of the apparatus when not in use. There is also included a recoilable line marker attached to the side of the apparatus.

5 Claims, 4 Drawing Figures

LIGHTED AND MAGNETIZED TAPE MEASURE WITH COMBINATION MARKER AND CLOTHING-ATTACHMENT ARM MEMBER

BACKGROUND OF THE INVENTION

1. Field of the Invention

The apparatus of the present invention relates to measuring tapes. More particularly, the apparatus of the present invention relates to a recoilable measuring tape which combines a light for reading in the dark, a magnetized foot portion for magnetically maintaining apparatus on the steel beam or the like, a retractable chalk line and a flexing member for attachment to the belt of the carrier.

2. General Background

In the construction industry, particularly for carpenters or the like, one of the most important instruments utilized in the construction of buildings and other structures is the metal measuring tape which is recoilable into a container. This type of measuring tape is relatively well known in the art, and is used by any and all fields of construction. However, some of the problems encountered with the use of the present type of measuring tape which is normally a metal flexible band recoilable into a container, is the fact that often times the apparatus is difficult to place when not in use in view of the fact that it seldome fits in one's pocket. Also, and more importantly, is that during use, some of the problems encountered are the fact that the tape must be read in darkened areas such as attics or beneath raised foundations, or when used in a higher elevation, for example on metal beams in construction of buildings, the apparatus, if not placed in a secure position, can be lost and dropped to the ground.

Several patents have been issued which address metal recoilable tape measures, with additional features, the most pertinent being as follows:

U.S. Pat. No. 2,992,487, issued to Miller entitiled "Measuring Rule" teaches the use of a self-retracting flexible steel tape measuring rule which has as one of its features a housing for an illuminating source, such as a light, for illuminating the indicia of the measuring tape when the tape is withdrawn from the housing.

U.S. Pat. No. 2,804,538, issued to Leone, entitled "Illuminated Measuring Device", relates to a measuring tape and means for illuminating the tape. There is also included a switch for powering the light source.

British Pat. No. 1,194,558 entitled "Illuminated Tape Measure" also claims a tape measure having a lighting source contained within the housing. The measuring instrument has a flexible tape coiled into a roll in the casing which is withdrawable from an outlet on the side of the casing, a window in the casing for viewing the graduations on the outermost turn of the roll, and a light source for lighting the window, the light source being powered by a battery means in the casing.

French Pat. No. 1,446,379 relates to a tape measure with a light source for indicating the graduations on the tape. Like the previous patents, this particular patent also shows a bulb powered by a battery for illuminating the tape during use.

French Pat. No. 1,473,242, although it does not indicate the use of a light source in combination with a coiled measuring tape, does illustrate the use of a magnet for use in combination with a measuring tape. This magnet is placed on the base of the tape for fixing the tape onto a metal object while being measured.

U.S. Pat. No. 2,230,668, issued to Ohrtmann, entitled "Steel Tape Measure"; U.S. Pat. No. 1,276,311, issued to Armbruster, entitled "Measuring Instrument"; and U.S. Pat. No. 2,354,853, issued to Dobbs, entitled "Flashlight Holder" are patents which do illustrate a measuring apparatus with lighting means.

GENERAL DISCUSSION OF THE PRESENT INVENTION

The apparatus of the present invention solves the shortcomings in the present state of the art in a simple and straightforward manner. What is provided is a housing for flexible recoilable measuring tape which would include a battery operated light for emitting light directly onto the tape; a magnetic foot member attached to the base of the apparatus for adhering onto metal beams or the like; a flexing holder wherein the belt or waistband would be engaged between a flexing arm and the apparatus for placement of the apparatus when not in use, and a wiper for cleaning the tape when it is retracted into the container. There is also included a recoilable line marker attached to the side of the apparatus of the present invention.

Therefore, it is an object of the present invention to provide a container for a measuring tape having a light member for enabling one to utilize the tape in a darken area.

It is a further object of the present invention to provide an apparatus wherein it is securely adhered to metal by way of a pair of magnetized foot members;

It is still a further object of the present invention to provide an apparatus which can be carried on the belt or waistline of the user by engaging the waistline or belt between the flexing arm member and the body of the apparatus.

BRIEF DESCRIPTION OF THE DRAWINGS

For a further understanding of the nature and objects of the present invention, reference should be had to the following detailed description, taken in conjunction with the accompanying drawing, in which like parts are given like reference numerals and, wherein.

DETAILED DESCRIPTION OF THE PREFERRED EMBODIMENT

Figure 1:
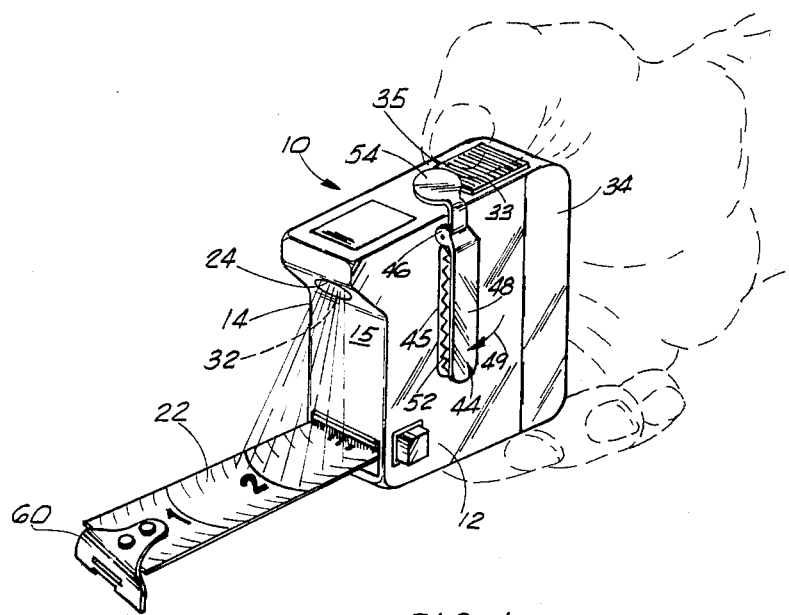
FIG. 1 is an overall perspective view of the preferred embodiment of the apparatus of the present invention.

FIGS. 1 through 4 illustrate the preferred embodiment of the apparatus of the present invention by the numeral 10. Apparatus 10 would comprise generally a closed container having a side wall 12 and 14, a front wall 15, rear wall 17, and top and bottom walls 18 and 19 respectively. The configuration of the aforesaid walls would define a container 20 for housing a recoilable, preferably metal tape 22, which is known in the industry, and is extendable out of the container 20 for measuring the lengths of items, and is recoilable back into the container when not in use. The operation of the metal tape itself in moving in and out of the container 20 is not new in the art, and is well known at this time.

Figure 2:
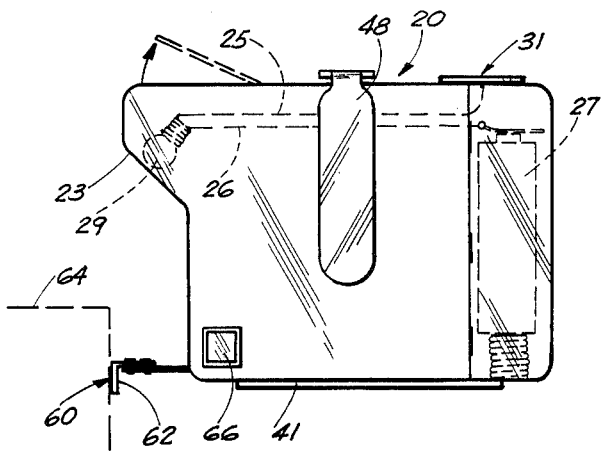
FIGS. 2 and 3 are left and right side views of the preferred embodiment of the apparatus of the present invention.
Figure 3:
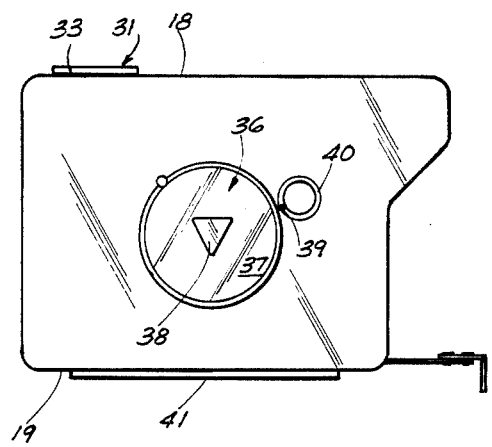
Figure 4:
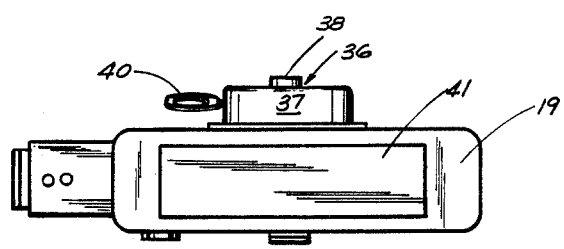
FIG. 4 is a bottom view of the preferred embodiment of the apparatus of the present invention.

As seen in the figures, front wall portion 15 further provides an angularly disposed protrusion 23 which serves as a face for light emitting means 24 recessed within the lower portion of protrusion 23. Essentially, light emitting means 24 which comprises a bulb member 29 as seen in phantom view in FIG. 2 which is connectably engaged via a pair of wire members 25 and 26 to a power source, preferably a size "AA" penlight battery 27, also seen in phantom view. In FIG. 2 penlight battery 27 would provide energy to light 29 with the movement of a switching member 31 located on the top wall 18 of the apparatus 10, and shielded from inadvertent switching by side walls 33 and 35. In further discussing the lighting means 24, FIG. 1 also illustrates a window portion 32 which is flush with the surface of the angularly disposed protrusion 23, wherein, as illustrated in FIG. 1, light is being emitted therefrom onto the face of tape measure 22. This would be particularly suitable for utilization of the apparatus in darkened places. As is also seen in FIGS. 1 and 2, side wall 12 provides a hinged door member 34 which moves between opened and closed positions, for acquiring access to battery 27, for replacement thereof.

A bubble level 35, well-known in the art, is also attached to top wall 18. Preferably, the longitudinal axis of the level is oriented in a horizontal plane parallel to bottom wall 19 and the lower surface contact portions of magnets 41 and 43, and oriented in a vertical plane parallel to side walls 12 and 14.

On the opposite wall 17 of apparatus 10, there is provided chalk line dispensing means 36 which comprises substantially a circular housing 37 which houses a recoilable measuring line therein 39, which is extendable via ring 40 out of the container 37 for utilization in its typical use, i.e., scoring a length of wood or the like for cutting along the scored section. Return arm wheel 38 provides means for retrieving chalk line 39 after use.

Positioned on lower floor portion 19, there comprises magnetic foot member 41, which is permanently adhered to floor portion 19, but serves to magnetically attach the apparatus to a steel beam or the like in order to prevent inadvertent falling of the apparatus therefrom should one place it improperly on the beam.

When the apparatus is not in use, there is provided on wall portion 12, an attachment means 44, which comprises a base plate 45 permanently adhering to wall 12, being substantially flat and unobtrusive. On the upper end portion of base plate 45 there is provided hinging means 46, which hingedly engages a flexing arm member 48, which is substantially the same configuration or shape as base plate 45, and which flexes onto and away from base plate 45 as seen by arrow 49. Arm member 48, is normally in the closed position as seen in FIG. 1, due to a spring loaded hinge member 46, so that the spring would actuate arm member 48 in engagement against base plate 45. As seen in FIG. 1, arm member 45 further comprises a plurality of teeth 52, which would normally engage the belt or exterior of the waistband of trousers when the waistband is placed between base plate 45 and flexing arm member 48. In the placement thereof, there is provided an upper plate member 54, which when pressure is put thereupon, and it is pressed downward, the arm member 48 moves outwardly away from base plate 45 against the biasing of the spring. This would insure easy placement and removal of the apparatus from the belt or waistband should one want to utilize the apparatus.

To expand the use of tape measure 22, there is provided magnetic end portion 60 so that in the event end portion 60 cannot "hook" the edge of a beam or the like being measured by downward depending lip 62, the end 60 could magnetically contact a metal beam 64, as seen in FIG. 2, in phantom view, in order to be extended outward for proper measurement. Upon depression of button 66, tape member is retracted.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as the invention is:

1. A flexible retractable tape rule having a case with bottom, top, front, rear and side walls and a flexible tape coiled within the casing which is extendable and recoilable through an opening of the front of the casing, and an improvement for removably securing said apparatus to clothing articles and the like for storage comprising:
   a. a flexible arm member pivotally affixed to a side wall so that clothing and the like can be inserted between the casing the flexible arm member;
   b. a spring means affixed to the flexible arm member which biases the flexible arm member to pivot against the casing; and
   c. an upper plate attached to and extending from the flexible arm member to a position above another wall surface of the casing so that the flexible arm member can be pivoted by depressing the upper plate without the need for direct operator access to the flexible arm member.

2. The improvement of claim 1 which further provides a high friction surface between the flexible arm member and the casing to inhibit clothing and the like secured by the flexible arm member from sliding between the flexible arm member and the casing.

3. The improvement of claim 1 in which the flexible arm member is pivotally secured to a base plate which is affixed to the casing.

4. The improvement of claim 1 in which the upper plate forms an angle to extend the flexible arm member to a position above the top surface of the casing so the flexible arm member can be pivotally actuated from the top surface of the casing.

5. A tape measuring apparatus which comprises:
   a. a casing with a front, back, top, bottom and side wall surfaces in which the top and bottom surfaces are parallel;
   b. flexible tape coiled within the casing which is extendable and recoilable through an opening in the front wall of the casing;
   c. a protrusion of the front wall of the casing;
   d. light emitting means recessed within the lower portion of the protrusion such that light is focused on the tape as it extends through an opening of the front wall of the casing;
   e. a magnetized hook at the end of the tape which prevents the end of the tape from entering the opening of the front wall of the casing and magnetically anchors the end of the tape during measuring operations;
   f. magnetized feet on the lower surface of the casing for magnetically adhering the casing to metallic surfaces;

g. a switch means mounted on the top wall of the casing near the end proximate the rear wall for controlling the light emitting means;

h. a flexible arm member pivotally affixed to a side wall of the casing for removably securing the tape measuring apparatus to clothing articles and the like for storage which further comprising;

i. a spring means affixed to the flexible arm member which biases the flexible arm member to pivot against the casing;

j. an upper plate attached to and extending from the flexible arm member to a position above the top surface of the casing so the flexible arm member can be pivotally actuated from the top surface of the casing; and k. a chalk line coiled in a housing affixed to the side wall of the casing opposite the side wall on which the flexible arm is affixed, the housing having an opening through which the chalk line can be extended and retracted in a direction substantially similar to the tape, said chalk line having a stop means at its end to prevent complete retraction of the chalk line to the housing.

* * * * *